Aug. 19, 1952  R. E. WAGENHALS  2,607,127
WALL THICKNESS GAUGE

Filed Nov. 10, 1947  2 SHEETS—SHEET 1

INVENTOR:
Robert E. Wagenhals,
BY Carr & Carr & Grandy
HIS ATTORNEYS

Aug. 19, 1952  R. E. WAGENHALS  2,607,127
WALL THICKNESS GAUGE

Filed Nov. 10, 1947  2 SHEETS—SHEET 2

INVENTOR;
Robert E. Wagenhals,
BY Carr & Carr & Gravely
HIS ATTORNEYS

UNITED STATES PATENT OFFICE 2,607,127

WALL THICKNESS GAUGE

Robert E. Wagenhals, Canton, Ohio, assignor to The Timken Roller Bearing Company, Canton, Ohio, a corporation of Ohio Application November 10, 1947, Serial No. 784,991

2 Claims. (Cl. 33—174)

This invention relates to gages and in its more specific aspects is directed to a gage for determining the wall thickness and taper of annular bodies.

The object of this invention is to provide a gage specifically designed to determine the taper of the raceway members of tapered roller bearings although the gage may be employed to determine the wall thickness or dimensional variations of any other variety of tubular cylindrical shell or body.

Figure 1:
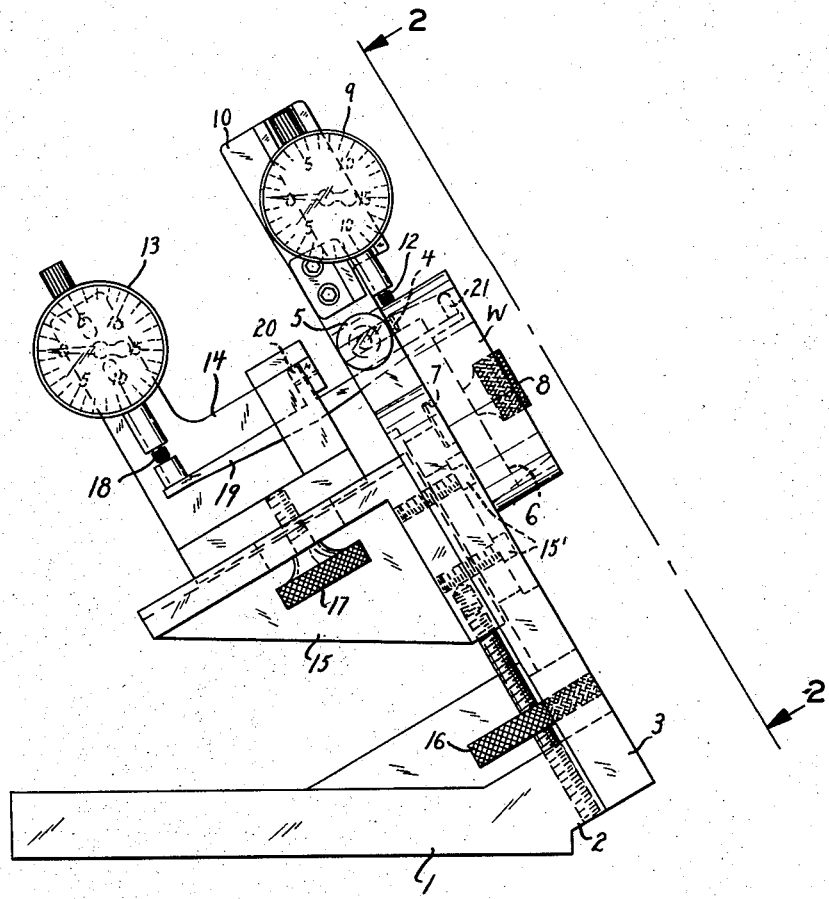
Fig. 1 is a side elevational view of a gage embodying the invention.
Figure 2:
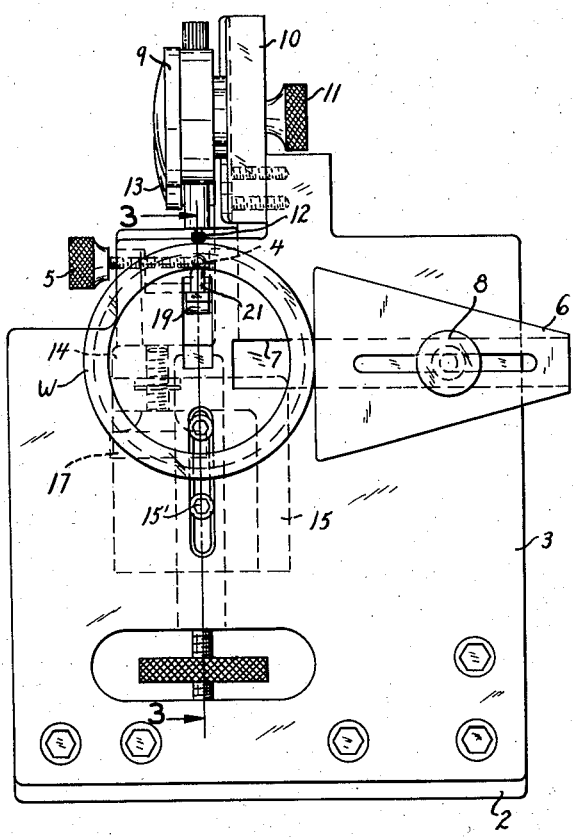
Fig. 2 is a front elevational view thereof looking in the direction of line 2—2 of Fig. 1.
Figure 3:
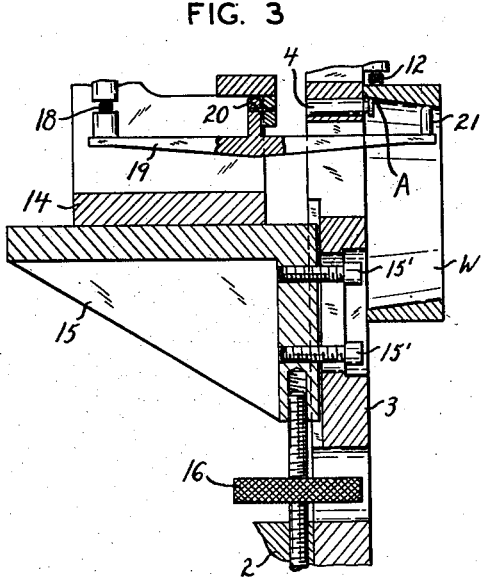
Fig. 3 is a sectional view taken substantially along the line 3—3 of Fig. 2.

Referring now to the drawings, numeral 1 designates a base plate that is provided with an angular portion 2 to which a face plate 3 is suitably secured that extends upwardly and rearwardly. A cylindrical member "W" supporting means in the form of a reference pin 4 is secured in a portion of the face plate and is held in position by a thumbscrew 5. By placing plate 3 at the angle shown, gravitational action will keep a work piece suspended from pin 4 against the upper surface of plate 3. The pin 4 may also take the form of a roller or any other suitable device from which an article being gaged is suspended while supported thereon. A suitably tongued stop member 6 is slidably arranged in a groove 7 formed in the face plate 3 and is locked in adjusted position by means of a thumbscrew 8. The left hand face of the stop member 6 is machined to close tolerances and laterally supports a tubular cylindrical member "W" being gaged with reference to the point "A" in order to hold it in predetermined position, preferably centralized with reference thereto, as particularly illustrated in Figs. 1 and 2.

The variations in outer diameter or wall thickness of a tubular cylindrical member are gaged by means of a gage 9 mounted on the member 10 secured to the face plate 3 and is adjustably secured to member 10 by means of a thumbscrew 11. The gage 9 is a conventional device provided with a movable contact member 12 and is engageable with the tubular cylindrical member "W." As the member is rotated over the pin 4, wall thickness variations will be indicated upon the gage 9.

Deviations and variations in the internal or inner diameter or taper of the tubular cylindrical member "W" are indicated on gage 13 which is similar in construction to gage 9. This gage is mounted on a fixture 14 that is supported on a structural member 15 adjustably secured to the back of face plate 3 and is adapted for vertical adjustment with respect to the face plate by means of a thumbscrew 16. The member 15 is locked to face plate 3 by suitable clamping means 15'. The fixture 14 is laterally adjustable upon the member 15 and is locked thereto by means of a thumbscrew 17. The contact member 18 of the gage 13 engages one end of a lever 19 which is fulcrumed to the fixture 14 by a pair of reeds 20 which are of a conventional design. The opposite end of lever 19 is provided with a feeler 21 which contacts the inner face of the cylindrical member "W" and by means of which variations in the inner diameter are gaged. Other portions of the inner diameter of a tapered or other tubular cylindrical member are gaged by the feeler 21 and gage 13 by adjusting the fixture 14 laterally along member 15. In the event the thickness of the work piece is such that it cannot be positioned as illustrated in the several figures, then the member 15 is vertically adjusted on the face plate 3 so that the member "W" may be installed so that it will rest upon the end of pin 4 and engage the feeler 21.

One mode of quickly determining whether or not a given piece "W" is within prescribed dimensions is to take a master piece "W," insert it in the measuring device and note the extreme limits of movement of the dial points as it is rotated about pin 4 on the face of plate 3 and then mark the dial faces to indicate those allowable limits. Other annular work pieces "W" are then installed in the device so that they are supported on the pin 4 and on the plate 3 with the outer surface in engagement with the number 6. The gage feelers are then brought into engagement with the inner and outer work piece surfaces. The work piece "W" is then rotated so that every point on its internal and exterior surface is gaged and then fixture 14 is adjusted so that various other portions of the internal surface may be gaged. When, in measuring any other member "W," the gage pointer moves beyond the marks on the dial face, such members will, of course, be rejected as unsuitable for the purposes intended. It should be clear, therefore, that various wall thicknesses of tubular members and diameters of cylindrical members may be measured in the device by laterally adjusting the stop member 6 and by suitably laterally and vertically adjusting the fixture 14 and the member 15, respectively.

What I claim is:

1. A device for gaging dimensional variations of the inner and outer surfaces of a cylindrical tubular work piece comprising a base plate; a rearwardly and upwardly inclined face plate secured to said base plate; means projecting from said face plate from which to suspend the work piece on its inner surface; means on said face plate for providing lateral support for said work piece and engageable with the outer surface thereof; means for adjustably clamping said last mentioned means to said face plate so that it may be moved relative to said projecting means; a bracket mounted on said face plate; means for adjusting said bracket on said face plate relative to said work piece along one dimension thereof; a gage supporting frame mounted on said bracket; means for adjusting said frame on said bracket along another dimension of the work piece; a pivoted lever in said frame one end of which is engageable with said work piece; and a gage supported on said frame engageable with the other end of said lever.

2. A device for gaging dimensional variations of the inner and outer surfaces of a cylindrical tubular work piece comprising a base plate; a rearwardly and upwardly inclined face plate secured to said base plate; means projecting from said face plate from which to suspend the cylindrical member on the inner surface thereof; means on said face plate for supporting the outer surface of said cylindrical work piece and for laterally positioning said work piece on said plate; a bracket adjustably supported on said face plate; a pivoted lever supported on said bracket having means on one end thereof for engaging the work piece; and a gage on said bracket engageable with the other end of said lever.

ROBERT E. WAGENHALS.

REFERENCES CITED

The following references are of record in the file of this patent:

UNITED STATES PATENTS

| Number | Name | Date |
|---|---|---|
| 1,446,149 | Benoit et al. | Feb. 20, 1923 |
| 1,613,678 | Schwarz, Jr. | Jan. 11, 1927 |
| 1,625,462 | Frauenthal | Apr. 19, 1927 |
| 1,637,482 | Graves | Aug. 2, 1927 |
| 1,769,077 | Small | July 1, 1930 |
| 1,769,129 | Graham | July 1, 1930 |
| 1,832,953 | Watling et al. | Nov. 24, 1931 |
| 2,024,020 | Aldeborgh | Dec. 10, 1935 |
| 2,030,237 | Brittain, Jr., et al. | Feb. 11, 1936 |
| 2,348,018 | Moore | May 2, 1944 |
| 2,407,490 | Gregg | Sept. 10, 1946 |
| 2,420,711 | Look | May 20, 1947 |

FOREIGN PATENTS

| Number | Country | Date |
|---|---|---|
| 412,855 | Germany | Apr. 28, 1925 |
| 476,453 | Germany | May 21, 1929 |
| 557,578 | Great Britain | Nov. 26, 1943 |

OTHER REFERENCES

"American Machinist Magazine," April 12, 1945, May 22, 1947.